Figure 1:
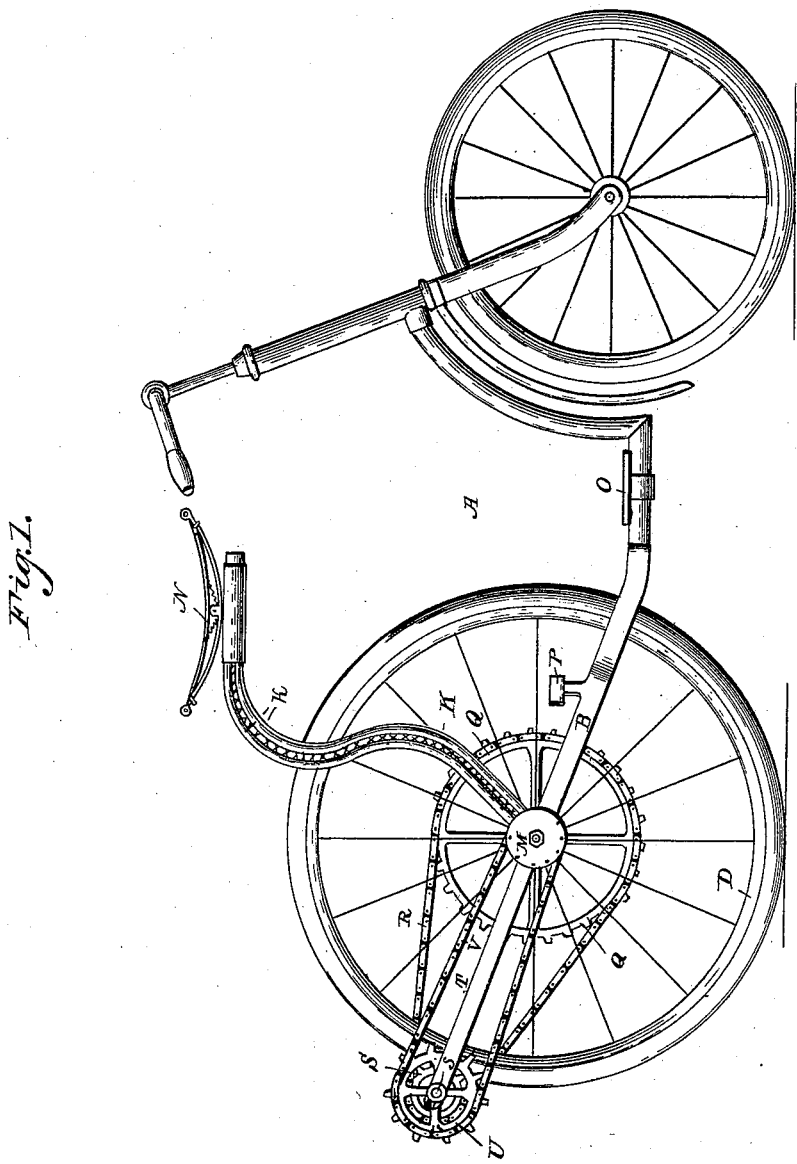

(No Model.) 2 Sheets—Sheet 1.
W. C. LANGDON.
MECHANICAL MOTOR.

No. 505,946. Patented Oct. 3, 1893.

Witnesses
J. Ulke
[signature]

Inventor
Wm C. Langdon,
By his Attorneys,
C. A. Snow & Co.

(No Model.) 2 Sheets—Sheet 2.
W. C. LANGDON.
MECHANICAL MOTOR.
No. 505,946. Patented Oct. 3, 1893.
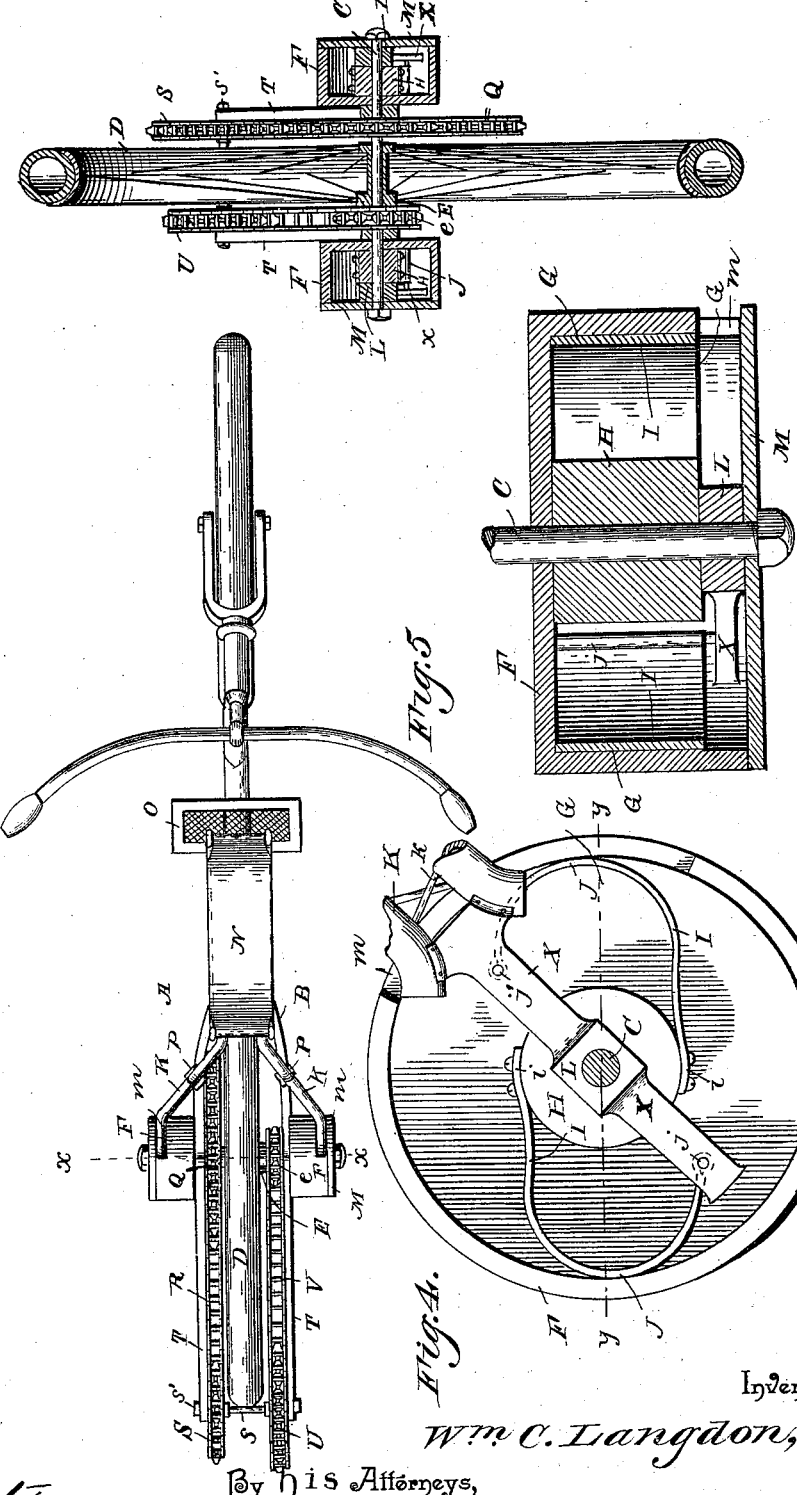
Witnesses
J. Ulke
L. P. Woehaupter
Inventor
Wm. C. Langdon,
By his Attorneys,
C. A. Snow & Co.

UNITED STATES PATENT OFFICE.

WILLIAM C. LANGDON, OF ERIE, ASSIGNOR OF ONE-HALF TO P. E. SHIPLER, OF MERCER, PENNSYLVANIA.

MECHANICAL MOTOR.

SPECIFICATION forming part of Letters Patent No. 505,946, dated October 3, 1893.

Application filed March 23, 1893. Serial No. 467,330. (No model.)

*To all whom it may concern:*

Be it known that I, WILLIAM C. LANGDON, a citizen of the United States, residing at Erie, in the county of Erie and State of Pennsylvania, have invented a new and useful Mechanical Motor, of which the following is a specification.

This invention relates to mechanical motors; and it has for its object to provide an improved mechanical motor employed particularly for the propulsion of bicycles, other vehicles, boats, for operating toys and for all similar uses to which a mechanical propelling device could be employed.

To this end the main and primary object of the invention is to provide an improved mechanical motor or propelling device which is designed to be operated by weight and preferably the weight of a person, so that a powerful leverage will be secured as well as a very high rate of speed.

With these and many other objects in view which will readily appear as the nature of the invention is better understood, the same consists in the novel construction, combination and arrangement of parts hereinafter more fully described, illustrated and claimed.

In the accompanying drawings:—Figure 1 is a side elevation of a safety bicycle having a propelling device or mechanical motor applied thereto as contemplated by this invention. Fig. 2 is a top plan view of the same. Fig. 3 is an enlarged detail sectional view on the line $x$—$x$ of Fig. 2. Fig. 4 is an enlarged elevation of one of the friction clutches with the inclosing face cap removed. Fig. 5 is an enlarged detail sectional view of the same, on the line $y$—$y$ of Fig. 4.

Referring to the accompanying drawings, A represents a safety bicycle of ordinary construction having the rear bearing fork or rearwardly extending bearing arms B, in which is journaled the drive shaft C, on which shaft between the arms of the fork is loosely mounted the rear drive wheel D. The rear drive wheel D, is provided at one side with a hub E, having the integral small sprocket wheel $e$, to which is connected the gearing for driving the rear drive wheel in the manner now to be described.

Fixedly attached to opposite ends of the drive shaft C, outside of the bearing arms B, are the opposite fixed clutch disks F, provided at one side with the face pockets G, in which are arranged the movable clutch disks H, loosely attached to the shaft ends so as to work inside of the face pockets of the fixed clutch disk, and of a diameter less than the surrounding walls of the face pockets so as to leave a space between the periphery of the movable disk H, and the walls of the said pockets of the fixed clutch disks. Oppositely arranged in the face pockets of the fixed clutch disks, and above the movable disks H, therein are the oppositely arranged clutch springs I. The clutch springs I, are fixedly attached at one end as at $i$, to the periphery of movable disks H, at diametrically opposite portions thereof, and are provided with opposite bowed ends J, which are attached at their extremities at $j$, and $j'$, to the extension arms X, attached to the lower ends of the swinging or oscillating operating levers or arms K.

The swinging or oscillating operating levers K, are arranged as illustrated in the drawings on both sides of the bicycle drive wheel D, and comprise light parallel braced rods $k$, and carry the arms X, referred to, and which are provided with fulcrum boxes L, loosely fitting the opposite extremities of the drive shaft C, alongside of the movable clutch disks H, and serve to hold the same in position inside of the fixed clutch disks F. Cap plates M, are secured to the outer faces of the movable disks H, so as to inclose the parts of the clutches, and hold the levers K, to their movement within the slots $m$, cut in the flange of the disks F.

The upper extremities of the swinging or oscillating levers K, have attached thereto an adjustable seat N, set forth in my separate application, filed March 21, 1893, and bearing Serial No. 467,054, and which of course is to be a weight in other applications of the motor, but which in the present case is designed to accommodate the rider whose feet are placed on suitable foot rests O, attached to the frame of the machine between the two wheels, and in order to turn the drive shaft G, it is only necessary for the rider to allow himself to fall slightly with the upper extremities of the swinging levers, which are limited by suitably arranged stops P, and to rise again to secure a new grip for the clutch devices. It will be apparent by an inspection of the drawings, and particularly Fig. 4, that when the opposite levers K, lower, the bowed ends J, of the clutch springs I, are bulged or forced tightly out against the inner peripheries of the disks F, so as to secure a firm frictional grip, which is sufficient to turn the fixed clutch disks F, and the drive shaft to which they are attached. Now on the other hand when the operator relieves the upper ends of the levers from his weight, the bowed ends of the springs, in assuming their normal positions, will throw the levers back to their farthest position, while at the same time releasing their grip on the fixed clutch disks F. In toys and other similar objects after the upper ends of the operating levers have fallen, the same will of course have to be raised again manually to secure a new grip.

Fixedly secured to the drive shaft C, alongside of one of the bearing arms and the drive wheel D, is the main drive sprocket wheel Q, which is of a sufficient diameter to secure the proper gearing of the vehicle, in order to have the same attain any speed desired. The sprocket wheel Q, drives the main drive chain R, which leads therefrom over a small sprocket wheel S. The small sprocket wheel S is mounted on one end of the counter shaft s, mounted in a bearing s', arranged on the rear extremities of the arm extensions T, which are extended rearwardly from the bearing arms B, to dispose the gearing back of the drive wheel, so as to not be in the way of ladies' dresses, or with the feet of the rider. Fixedly secured to the opposite end of the shaft s, is a speed sprocket wheel U, which is larger than the sprocket wheel S, though smaller than the main drive sprocket wheel Q, and is designed to communicate motion to the auxiliary drive chain V, which passes therefrom over the drive wheel sprocket e, thereby transmitting motion through a system of gearing from the drive shaft C, to the drive wheel D, loosely mounted on such shaft. Now by reason of the gearing from the drive shaft to the drive wheel, it will be readily apparent that a very high rate of speed may be attained, and which of course can be regulated by the size of the sprocket wheel, while at the same time by reason of the specific driving clutches and the lever devices, simple and efficient means are provided for transmitting motion to the gearing with but a slight expenditure of power. It must also be apparent to those skilled in the art that the mechanical motor or propelling device herein described is not only available for use in connection with propelling bicycles, but the same is necessarily capable of use in other analogous relations for propelling other vehicles or light machinery, and I will have it understood that changes in the form, proportion and the minor details of construction as embraced within the scope of the appended claims, may be resorted to without departing from the principle or sacrificing any of the advantages of this invention.

Having thus described my invention, what I claim, and desire to secure by Letters Patent, is—

1. In a device of the class described, the combination of a turning drive shaft, a drive wheel loosely mounted on said shaft, friction clutches arranged on opposite extremities of the drive shaft and each having a large fixed disk and a smaller loose disk arranged inside of the fixed disk, opposite swinging levers fulcrumed on the drive shaft extremities, flat clutch springs attached at their extremities to the periphery of the smaller loose disks and to the swinging levers, respectively, and gearing leading from the turning drive shaft to the drive wheel loosely mounted thereon, substantially as set forth.

2. In a device of the class described, the turning drive shaft, a drive wheel loosely mounted on the shaft, friction clutches arranged on opposite extremities of the drive shaft and comprising fixed clutch disks turning with the shaft, movable clutch disks loose on the shaft alongside of the fixed disks, swinging or oscillating levers fulcrumed on the extremities of the shaft, and opposite clutch springs attached at one end to the periphery of the movable disks and at their other ends to said levers, being adapted to work against and grip the fixed clutch disk, and speed gearing leading from the turning drive shaft to said drive wheel, substantially as set forth.

3. In a mechanical motor, the turning drive shaft, a drive wheel loosely mounted on said shaft, friction clutches arranged on opposite extremities of the drive shaft and comprising fixed clutch disks turning with the shaft and provided at one side with face pockets, smaller movable clutch disks loose on the shaft and working inside of said face pockets, swinging levers fulcrumed on the extremities of the shaft, clutch springs arranged in the face pockets of the fixed clutch disks and attached at one end to diametrically opposite portions of the movable clutch disks, said springs being provided with bowed ends attached at their extremities to the swinging levers and contacting with the surrounding walls of said face pockets, and suitable gearing from the drive shaft to the drive wheel, substantially as set forth.

In testimony that I claim the foregoing as my own I have hereto affixed my signature in the presence of two witnesses.

WILLIAM C. LANGDON.

Witnesses:
J. H. SIGGERS,
BERNICE A. WOOD.